(12) United States Patent
Masubuchi

(10) Patent No.: US 6,472,442 B1
(45) Date of Patent: Oct. 29, 2002

(54) GRASPING PARTS

(75) Inventor: Tetsuo Masubuchi, Kanagawa (JP)

(73) Assignee: Asahi Kasei Kabushiki Kaisha (JP)

( * ) Notice: Subject to any disclaimer, the term of this patent is extended or adjusted under 35 U.S.C. 154(b) by 0 days.

(21) Appl. No.: 09/936,669

(22) PCT Filed: Jan. 16, 2001

(86) PCT No.: PCT/JP01/00232

§ 371 (c)(1),
(2), (4) Date: Sep. 14, 2001

(87) PCT Pub. No.: WO01/53371

PCT Pub. Date: Jul. 26, 2001

(30) Foreign Application Priority Data

Jan. 17, 2000 (JP) ........................................ 2000-007745
Jan. 27, 2000 (JP) ........................................ 2000-018919

(51) Int. Cl.$^7$ .............................................. C08G 18/44
(52) U.S. Cl. .................... 521/51; 521/173; 428/318.4; 264/45.2; 264/45.5; 264/46.7
(58) Field of Search ................ 521/51, 173; 428/318.4; 264/45.2, 45.5, 46.7

(56) References Cited

U.S. PATENT DOCUMENTS 4,855,377 A  *  8/1989  Yokota et al.

FOREIGN PATENT DOCUMENTS

| JP | 2-240124 A | 9/1990 |
|----|------------|--------|
| JP | 4-7327 A   | 1/1992 |
| JP | 5-51428 A  | 3/1993 |
| JP | 11-277575 A | 10/1999 |

* cited by examiner

*Primary Examiner*—Rachel Gorr
(74) *Attorney, Agent, or Firm*—Pennie & Edmonds LLP

(57) ABSTRACT

The present invention provides a gripping part such as a steering wheel and a grip, having a soft feeling equivalent to a RIM urethane and excellent sweat resistance, without the need of coating, which solves problems involved in RIM urethane steering wheels and grips including low productivity, low recycling property, and the like. That is, a gripping part comprising a foamed product of a thermoplastic elastomer with a 1.1 to 8.0 times expansion ratio, wherein the thermoplastic elastomer is a polyurethane elastomer comprises a specific polymer polyol, a polyisocyanate, and as needed, a chain extending agent reactive with the polyisocyanate.

8 Claims, 10 Drawing Sheets

A-A CROSS-
SECTIONAL VIEW (STEP 1) (STEP 2)

(STEP 1) (STEP 2)

GRASPING PARTS

TECHNICAL FIELD

The present invention relates to a gripping part such as a steering wheel and a grip, having a soft feeling equivalent to foaming RIM urethanes and having excellent sweat resistance, without the need of coating, which solves problems involved in RIM (reaction injection molding) polyurethanes including low productivity, low recycling property, and the like.

BACKGROUND ART

Conventionally, as a steering wheel and a grip (a shift lever grip, a door grip, a door upper part grip to be used at the time of getting on or off, a side brake lever, or the like) for the automobile interior, and a grip (handle) for a bag, those produced by covering an inserted metal core with a rigid resin material such as a polypropylene (PP) and a polyvinyl chloride (PVC) have been used. However, since the solid molded products of PPs or PVCs have a hard gripping feeling, they are scarcely used practically in the present situation. In contrast, since the foaming RIM urethane has excellent feeling, the material is used in most of steering wheels and grips at the present. However, the foaming RIM urethane involves problems of a long molding cycle and a poor yield, and furthermore, a problem of a poor recycling property since it is not thermoplastic. Then, steering wheels and grips using a soft material in place of the foaming RIM urethane have been variously proposed. JP-A-5-294247 (The term "JP-A" as used herein means an "unexamined Japanese patent application") proposes a steering wheel produced by molding an ester based or polyurethane elastomer having a surface hardness of from 60 to 99 in accordance with JIS K7215 type A or of 25 to 80 in accordance with JIS K7215. However, compared with the foaming RIM urethane, these steering wheels have insufficient soft feeling and sweat resistance, and furthermore, they are not sufficient also in terms of achieving a light weight.

Moreover, JP-A-8-183041, JP-A-6-170882 disclose a steering wheel comprising an olefin based or styrene based thermoplastic elastomer cover. Compared with the ester based or urethane based thermoplastic elastomers, the olefin based or styrene based elastomer can provide a low hardness so as to obtain a soft feeling, however, compared with a foaming urethane steering wheel, the feeling at the time of gripping differs (the initial stress is large), and thus it is insufficient in terms of the feeling. Moreover, since the olefin based, styrene based thermoplastic elastomer has a poor abrasion resistance, a problem of wearing out is involved in the case of a steeling wheel or a grip, which always comes in contact with a hand.

An object of the present invention is to provide a gripping part such as a steering wheel and a grip, having soft feeling and excellent surface outer appearance, further, being superior to the conventional products in ye the soft feeling, sweat resistance, abrasion resistance, light resistance and the oxidation deterioration resistance, and having a good elastic recovery property as a molded product such as a steering wheel and a grip.

DISCLOSURE OF THE INVENTION

The invention provides a gripping part, such as a steering wheel and a grip, comprising a foamed product of a thermoplastic elastomer with a 1.1 to 8.0 times expansion ratio, having a feature that the thermoplastic elastomer is a polyurethane elastomer produced by copolymerizing the following (a), (b) and, as needed, C):

(a) a polymer polyol which is an aliphatic polycarbonate comprising repeating units of the following formulae (1) and (2), with the ratio ((1)/(2)) of (1) to (2) being 10/90 to 90/10 (molar ratio) (wherein n is an integer of 4 and/or 5),

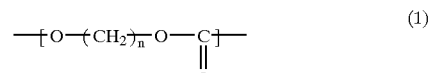

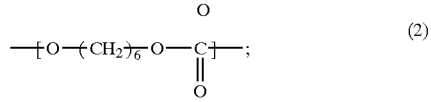

(b) a polyisocyanate; and (c) a chain extending agent reactive with the polyisocyanate.

Figure 1:
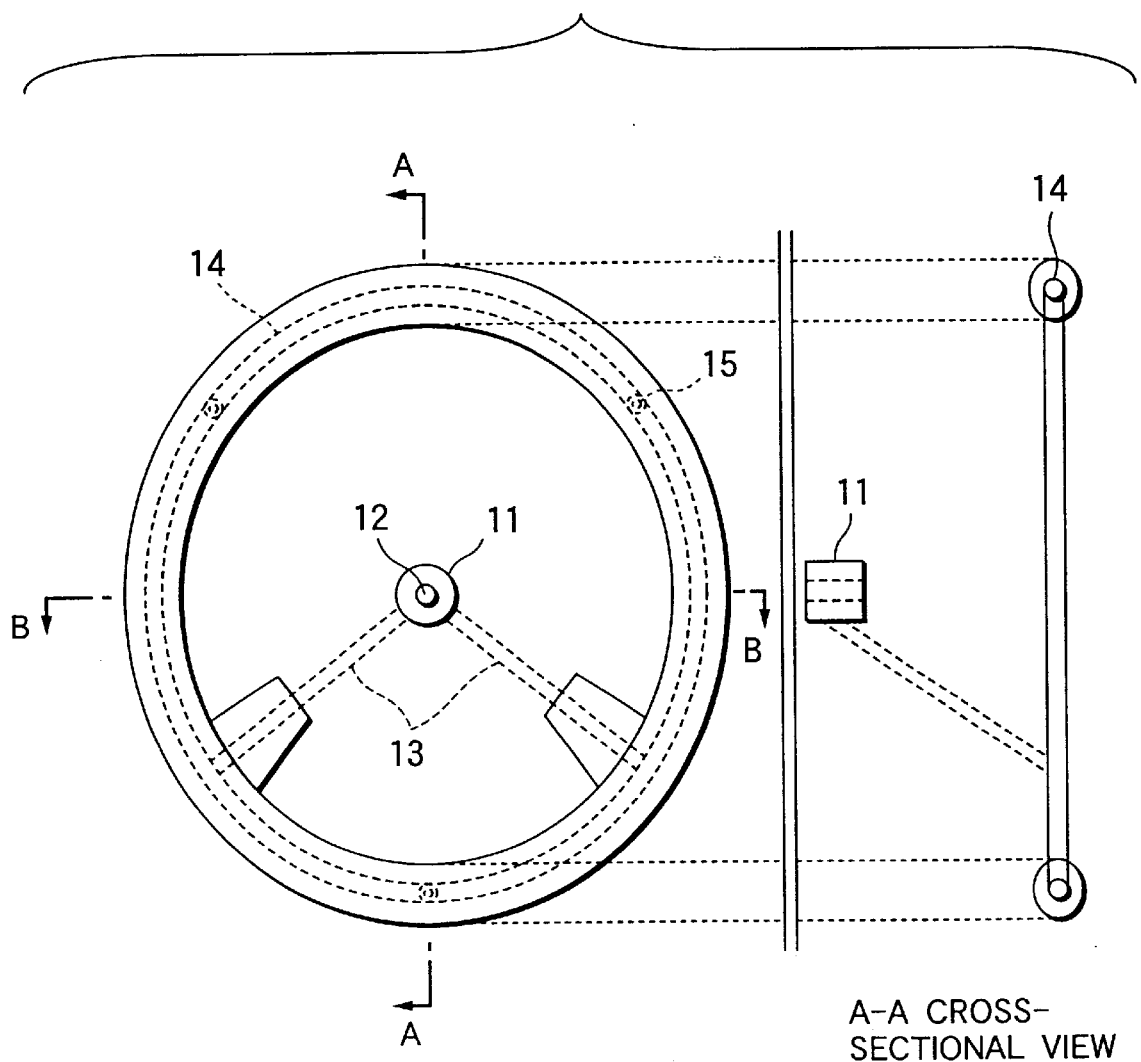
FIG. 1 is a plan view of a steering wheel according to an embodiment of the invention and a cross-sectional view taken on the line A—A.

The numerals in the figures represent the following:
11: a center boss of a steering wheel core bar,
12: a center hole of the center boss,
13: a spoke of the steering wheel core bar,
14: a ring-like rim of the steering wheel ore bar,
15: a trace of a pin for fixing the ring-like rim on a mold,
21: a skin layer of a foamed TPU grip,
22: a TPU foamed layer,
31: a movable mold,
32: a fixed mold,
33: a movable slide core,
34: a sprue,
35: a runner,
36: a pin for fixing the ring-like rim of the steering wheel core bar at the time of insertion,
41: a core bar,
42: a grip mounting hole, 51: a foamed TPU grip,
52: a TPU skin layer,
53: a TPU foamed layer,
61: a movable mold,
62: a fixed mold,
63: a movable slide core,
64: a sprue,
65: a runner,
66: a gate, and
67: a cavity part.

BEST MODE FOR CARRYING OUT THE INVENTION

Hereinafter, the invention will be explained in detail.

The aliphatic polycarbonate diol (a) used in a soft segment of the polyurethane elastomer of the invention can be synthesized by the various methods disclosed in "Polymer Review Vol. 9", P. 9 to 20 (1964) written by Schell. For example, it can be synthesized from, for example, 1,4-butane diol and/or 1,5-pentane diol, 1,6-hexane diol, and ethylene carbonate (EC). The ratio ((1)/(2)) of (1) and (2), which are repeating units in the polymer, is 10/90 to 90/10, preferably 20/80 to 80/20, and further preferably 40/60 to 60/40. In the case each repeating unit is outside the ratio, the soft feeling and the elastic recovery property of the steering wheel and the grip to be obtained are deteriorated, and thus it is not preferable.

The range of the average molecular weight of the aliphatic polycarbonate diol (a) used in the invention is generally 500 to 30,000 in terms of the number average molecular weight, preferably 600 to 20,000, and further preferably 700 to 10,000. It is desirable that substantially all the polymer terminals, at least one side thereof, are hydroxyl groups.

In the synthesis of the aliphatic polycarbonate diol of the invention, in addition to the above-mentioned diols, other diols, such as ethylene glycol, 1,2-propane diol, 1,3-propane diol, 1,2-butane diol, 1,3-butane diol, neopentyl glycol, 2,3-butane diol, 2,5-hexane diol, 2-methyl-1,3-propane diol, 3-methyl-l,5-pentane diol, 1,7-heptane diol, 1,8-octane diol, 2-methyl-1,8-octane diol, 1,9-nonane diol, 1,10-decane diol, 1,4-cyclohexane diol, and 1,4-cyclohexane dimethanol, may be added. These diols can be added by the ratio of 30% by weight or less with respect to the total diols, preferably 15% by weight or less.

Examples of the polyisocyanate (b) used in the invention include, for example, known aromatic diisocyanates such as tolylene diisocyanates (TDI) including 2,4-tolylene diisocyanate, 2,6-tolylene diisocyanate, and a mixture thereof, diphenyl methane-4,9'-diisocyanate (MDI), naphthalene-1,5-diisocyanate (NDI), 3,3'-dimethyl-4,4'-biphenylene diisocyanate, a coarse TDI, a polymethylene polyphenyl isocyanate, and a coarse MDI; known aromatic alicyclic diisocyanates such as a xylylene diisocyanate (XDI), and a phenylene diisocyanate; known aliphatic diisocyanates such as 4,4'-methylene biscyclohexyl diisocyanate (hydrogenated MDI), hexamethylene diisocyanate (HMDI), isophorone diisocyanate (IPDI), and cyclohexane diisocyanate (hydrogenated XDI), and an isocyanurate modified product, a carbodiimide product, and a biuret product of these isocyanates.

The addition amount of the polyisocyanates (b) is 10 to 150 parts by weight per 100 parts by weight of the aliphatic polycarbonate diol (a), preferably 20 to 100 parts by weight, further preferably 30 to 70 parts by weight.

Moreover, suitable chain extending agent to be used as needed in the present invention includes a chain extending agent having two active hydrogens reactive with an ordinarily used polyisocyanate in the polyurethane industry. The ordinarily used chain extending agents include known materials disclosed in P. 25 to 27 of "Latest Polyurethane Application Technology CMC 1985" supervised by Keiji Iwata, such as water, a low molecular weight polyol (generally, having a number average molecular weight of less than 300) and a polyamine. The blending amount of the chain extending agent is, generally, 0 to 100 parts by weight per 100 parts by weight of the aliphatic polycarbonate diol (a) used in the invention.

A known inexpensive polyol having a number average molecular weight of 300 to 5000 may be used together with the aliphatic polycarbonate diol (a) used in the invention depending on the use of the polyurethane so long as the effect of the invention is not impaired. The known polyols include the polyester polyols and polyether polyols disclosed in P. 12 to 23 of "Polyurethane Foam Polymer Publishing Association 1987" by Yoshio Imai.

The known polyols can be used preferably by 100 parts by weight or less per 100 parts by weight of the aliphatic polycarbonate diol (a) of the invention, further preferably 50 parts by weight or less.

As a method for producing the polyurethane elastomer of the invention, a urethane reaction technology known in the polyurethane industry can be used. For example, by reacting the aliphatic polycarbonate diol and an organic polyisocyanate from an ordinary temperature to 200° C., a thermoplastic polyurethane elastomer can be produced. Moreover, a thermoplastic polyurethane elastomer can be produced also by reacting the aliphatic polycarbonate diol with an organic polyisocyanate of an amount for providing isocyanate groups excessive with respect to the terminal hydroxyl groups of the aliphatic polycarbonate diol (preferably an amount for providing isocyanate groups of a 1.5 to 10 mole equivalent with respect to 1 mole of the terminal hydroxyl groups) from an ordinary temperature to 200° C. so as to produce a urethane prepolymer having an isocyanate group terminal, and adding a chain extending agent.

Thus, a thermoplastic polyurethane elastomer can be produced, using the aliphatic polycarbonate diol and a polyisocyanate, and as needed, a chain extending agent. In the production, known polymerization catalysts represented by a tertiary amine and organic metal salts of tin and titanium (disclosed, for example, in P. 23 to 32 of "Polyurethane Resin" written by Keiji Yoshida, published by Nippon Kogyo Shinbun Corp. (1969)) may be used. Moreover, these reactions may be carried out, using a solvent. Preferred solvents include dimethyl formamide, diethyl formamide, dimethyl acetoamide, dimethyl sulfoxide, tetrahydrofuran, methyl isobutyl ketone, dioxane, cyclohexanone, benzene, toluene, and ethyl celsolve.

Furthermore, in the polyurethane elastomer production of the invention, a compound containing only one active hydrogen that is reactive with an isocyanate group, such as monohydric alcohols including ethyl alcohol and propyl alcohol, secondary amines including diethyl amine and di-n-propyl amine, or the like can be used as an terminal stopping agent.

Since the polyurethane elastomer using the specific polycarbonate diol according to the invention has not only the excellent flexibility and elastic recovery but also an extremely good hydrolysis property, as compared to a conventional polyurethane elastomer using a polycarbonate diol using only 1,6-hexane diol, it provides excellent sweat resistance when used in a steering wheel or a grip, which is always in contact with a hand, and hence particularly preferred.

The shore D hardness of the polyurethane elastomer of the invention is, preferably in a range of 20 to 70, further preferably 25 to 50. The soft segment amount can be selected appropriately. With less than 20 shore D hardness, in the case it is used for a steering wheel or a grip after foaming, not only the followability with respect to the core bar is poor so as to involve a problem in the operativity but also the abrasion resistance is poor, and thus it is not preferable. With more than 70 shore D hardness, the soft feeling of the foamed steering wheel or grip to be obtained is insufficient, and thus it is not preferable.

The melt flow rate (230° C., 2.16 kg load value, hereinafter abbreviated as MFR) of the polyurethane elastomer of the invention is 0.5 to 100 g/10 minutes, preferably 5 to 50 g/10 minutes, and further preferably 10 to 30 g/10 minutes. With less than 0.5 g/10 minutes MFR, the injection molding property is poor so as to provide a short shot, and thus it is not preferable. Moreover, with more than 100 g/10 minutes MFR, not only the foaming gas cannot be maintained so as to deteriorate the foaming property but also the mechanical physical properties (strength at break, elongation at break, or the like), the abrasion resistance, the compression set (C-set), or the like are deteriorated, and thus it is not preferable.

As a stabilizing agent used in the invention, it is desirable to use a heat stabilizing agent or a light stabilizing agent.

As the heat stabilizing agent, phosphorus compounds such as aliphatic, aromatic or alkyl group substituted aromatic esters of a phosphoric acid or a phosphorous acid, a hypophosphorous acid derivative, a phenyl phosphonic acid, a phenyl phosphinic acid, a diphenyl phosphonic acid, a polyphosphonate, a dialkyl pentaerythritol diphosphite, and a dialkyl bisphenol A diphosphite; sulfur-containing compounds such as a phenol based derivative, in particular, a hindered phenol compound, a thioether based, a dithio acid salt based, a mercaptobenzimidazol based, and a thiocarbanilide based, a thiodipropionic acid ester; and tin based compounds such as a tin maleate, and a dibutyl tin monooxide, or the like can be used. These can be used alone or as a combination of two or more thereof In general, the heat stabilizing agents can be divided into primary, secondary, and tertiary heat stabilizing agents. In particular, as for a hindered phenol compound as the primary heat stabilizing agent, Irganox 1010 (product name: produced by Chibagaigi Corp.), Irganox 1520 (product name: produced by Chibagaigi Corp.), or the like are preferred. As for a phosphorous based compound as the secondary heat stabilizing agent, PEP-36, PEP-24G, HP-10 (product names: produced by Asahi Denka Corp.), and Irgafos 168 (product name: produced by Chibagaigi Corp.) are preferred. Furthermore, as for a sulfur compound as the tertiary heat stabilizing agent, thioether compounds such as dilauryl thiopropionate (DLTP), and distearyl thiopropionate (DSTP) are preferred.

Moreover, as needed, a light stabilizing agent may be added in the same manner. AS the light stabilizing agent, benzotriazol based compounds, benzophenone based compounds, or the like can be presented. Furthermore, a radical scavenging type light stabilizing agent such as a hindered amine compound can preferably be used as well.

The addition amount of the stabilizing agent is 0.01 to 10 parts by weight per 100 parts by weight of the polyurethane elastomer, preferably 0.1 to 5 parts by weight, and further preferably 0.2 to 3 parts by weight.

As a foaming agent used for forming the polyurethane elastomer, either organic based ones or inorganic based ones can be used as long as they are capable of foam molding a polyurethane elastomer by an ordinary injection molding. Specific examples of the foaming agents include azo compounds such as azodicarbonamide, nitroso compounds such as N,N'-dinitroso pentamethylene tetramine, carbonates such as sodium bicarbonate and ammonium bicarbonate, organic acids such as citric acid, sodium citrate and oxalic acid, and sodium boron hydrides. Moreover, a combination of a carbonate and an organic acid can be adopted. In the case of foaming at a relatively high temperature, compounds such as p,p'-oxybis benzene sulfonyl semicarbazide, p-toluene sulfonyl semicarbazide, trihydrazino triazine and barium azodicarboxylate can be used as well, but in general, azodicarbonamide is preferable. As a method for adding the foaming agent, either a method of adding a foaming agent at the time of kneading the materials, or a method of adding a foaming agent or a master batch thereof at the time of molding can be used.

The blending amount of the foaming agent is 0.01 to 10 parts by weight per 100 parts by weight of polyurethane elastomer, preferably 1 to 9 parts by weight, further preferably 2 to 7 parts by weight. In the case the amount of the foaming agent is less than the range, the expansion ratio is poor, but in the case the amount is more than the range, the foaming appearance is poor, and thus each is not preferable.

Moreover, as needed, a plasticizer may be added to the compound to be obtained. Examples of the plasticizer include phthalates such as a dioctyl phthalate, a dibutyl phthalate, a diethyl phthalate, a butyl benzyl phthalate, a di-2-ethylhexyl phthalate, a diisodecyl phthalate, a diundecyl phthalate, and a diisononyl phthalate; phosphates such as a tricredyl phosphate, a triethyl phosphate, a tributyl phosphate, a tri-2-ethyl hexyl phosphate, a trimethyl hexyl phosphate, a tris-chloroethyl phosphate, and a tris-dichloropropyl phosphate; trimellitates such as an octyl ester trimellitate, and an isodecyl ester trimellitate; dipentaerythritol esters; fatty acid esters such as a dioctyl adipate, a dimethyl adipate, a di-2-ethyl hexyl azelate, a dioctyl azelate, a dioctyl sebacate, a di-2-ethyl hexyl sebacate, and a methyl acetyl licinocate; pyromellitates such as a pyromellitic acid octyl ester; epoxy based plasticizers such as an epoxy soy oil, an epoxy linseed oil, and an epoxy fatty acid alkyl ester; polyether based plasticizers such as an adipic acid ether ester, and a polyether; liquid rubbers such as a liquid NBR, a liquid acrylic rubber, and a liquid polybutadiene; and a process oil.

These plasticizers can be used alone or in a combination of two or more thereof. The addition amount of the plasticizer can be selected appropriately according to the required hardness and physical properties, but it is preferably 1 to 50 parts by weight per 100 parts by weight of the composition.

In addition, so long as the physical properties are not impaired, fillers or reinforcing materials, such as a kaolin, a silica, a mica, a titanium dioxide, an alumina, a calcium carbonate, a calcium silicate, a clay, a kaolin, a diatomaceous earth, an asbestos, a barium sulfate, an aluminum sulfate, a calcium sulfate, a basic magnesium carbonate, a molybdenum bisulfate, a graphite, a glass fiber, and a carbon fiber; lubricating agents or mold releasing agents such as a zinc stearate, and a bisamido stearate; dyes and pigments for coloring, such as a carbon black, a ultramarine, a titanium white, a zinc white, a red iron oxide, an iron blue, an azo pigment, a nitro pigment, a lake pigment, and a phthalocyanine pigment; flame retarders such as an octabromo diphenyl, and a tetrabromo bisphenol polycarbonate; thickening agents such as an epoxy compound, and an isocyanate compound; and various known additives such as a silicone oil, and a silicone resin, or the like can be used.

The polyurethane elastomer used in the invention can be easily obtained in a form of pellets by melting and kneading by various extruders, banbary mixers, kneaders, rolls, or a combination thereof, and pelletizing.

Next, with reference to FIGS. 1 to 5 showing a production method of a steering wheel of the invention, explanation will be provided. FIG. 1 shows a steering wheel to be molded. The steering wheel has a center boss 11 at the center part, with a center hole 12 formed in the center boss 11. From the center boss 11, two spokes 13 elongate radially to the outer circumference side, with a ring-like rim 14 bonded with the tip ends of the spokes 13. The part comprising these parts 11 to 14 is generally made of a metal such as an iron and an aluminum. Hereinafter it is referred to as a core bar.

The rim part 14 and a part of the spokes 13 of the core bar are covered with a polyurethane elastomer (hereinafter abbreviated as a TPU) provided by injection foaming.

Figure 2:
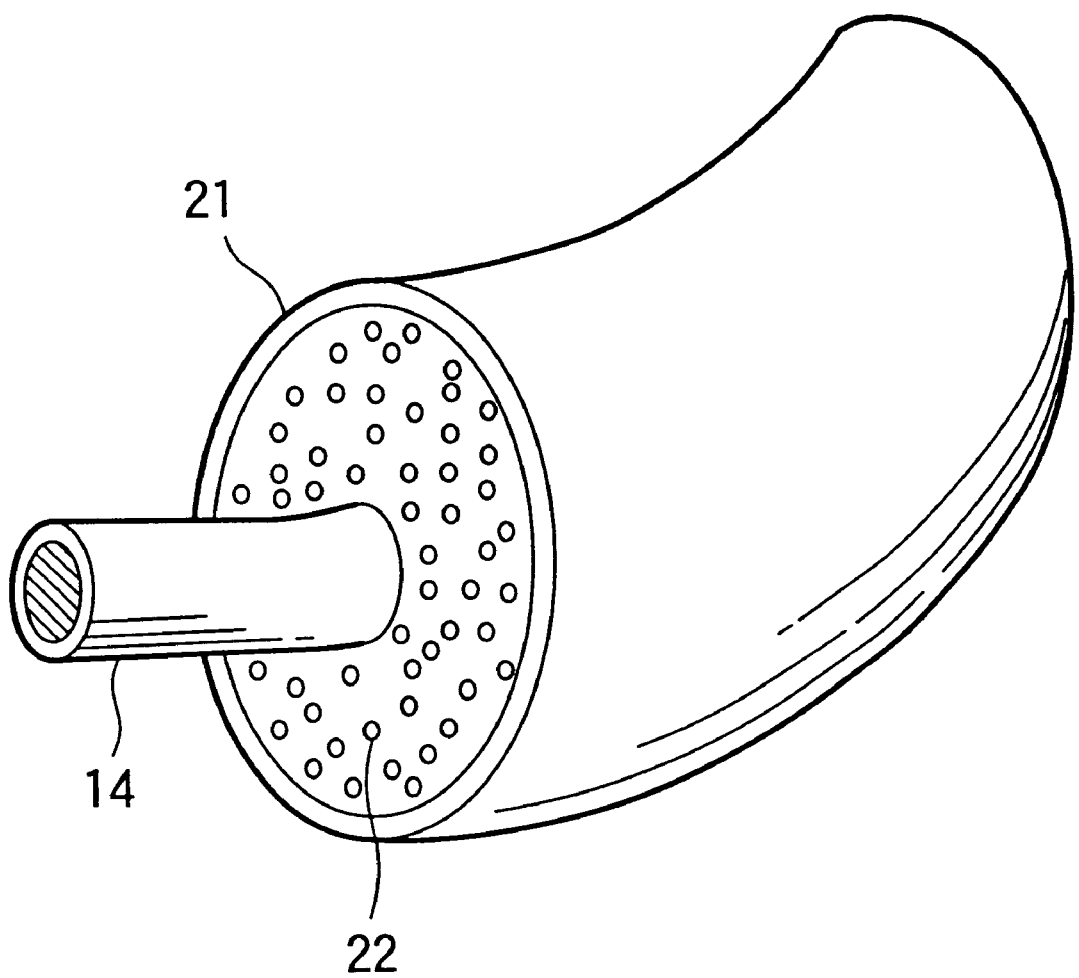
FIG. 2 is a notched perspective view taken on the B—B cross-section of the steering wheel shown in FIG. 1.

FIG. 2 shows a cross-section of the molded product with the ring-like rim 14 covered with the TPU. The TPU molded part has the inside 22 formed, with a non-foamed skin layer 21 formed on the surface.

Figure 3:
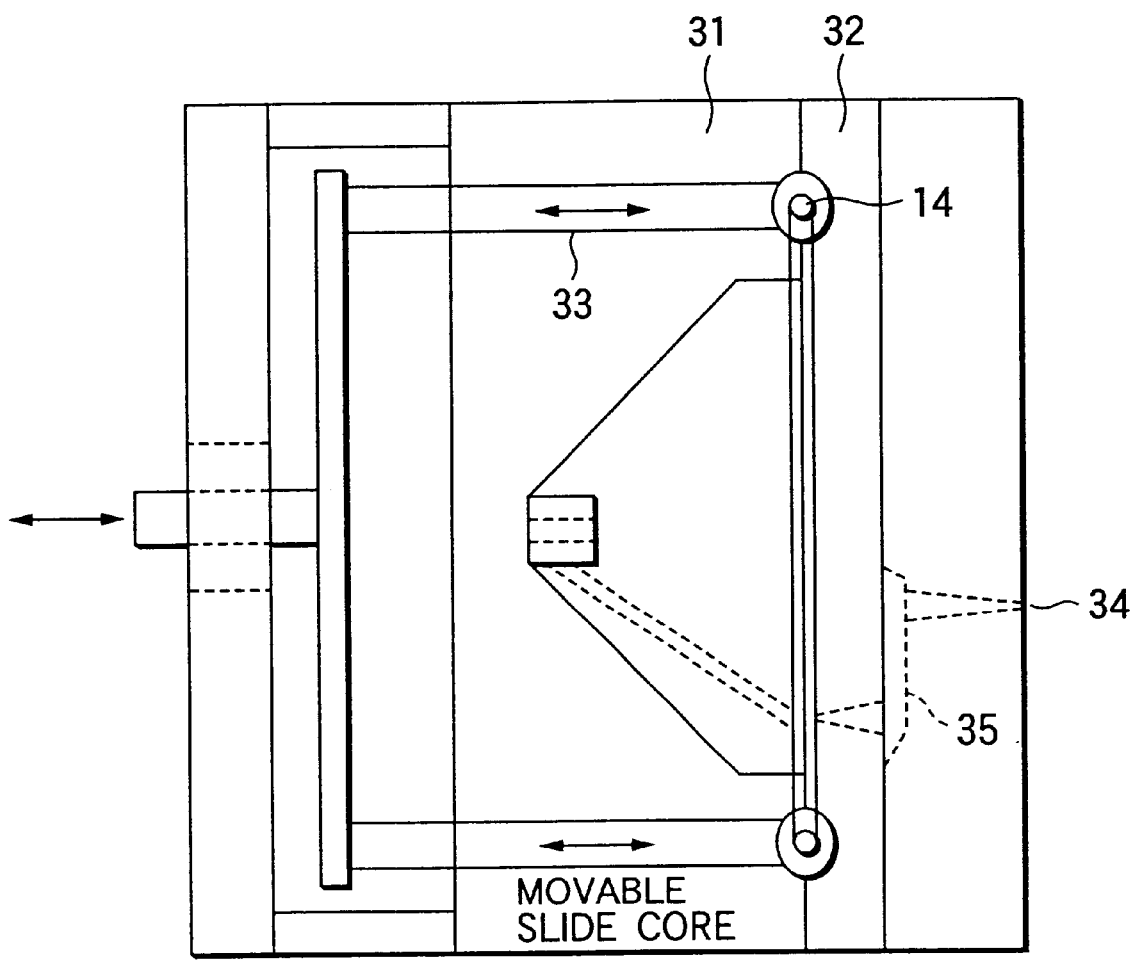
FIG. 3 is a diagram showing the structure of a mold viewed from the side of a molding machine.
Figure 4:
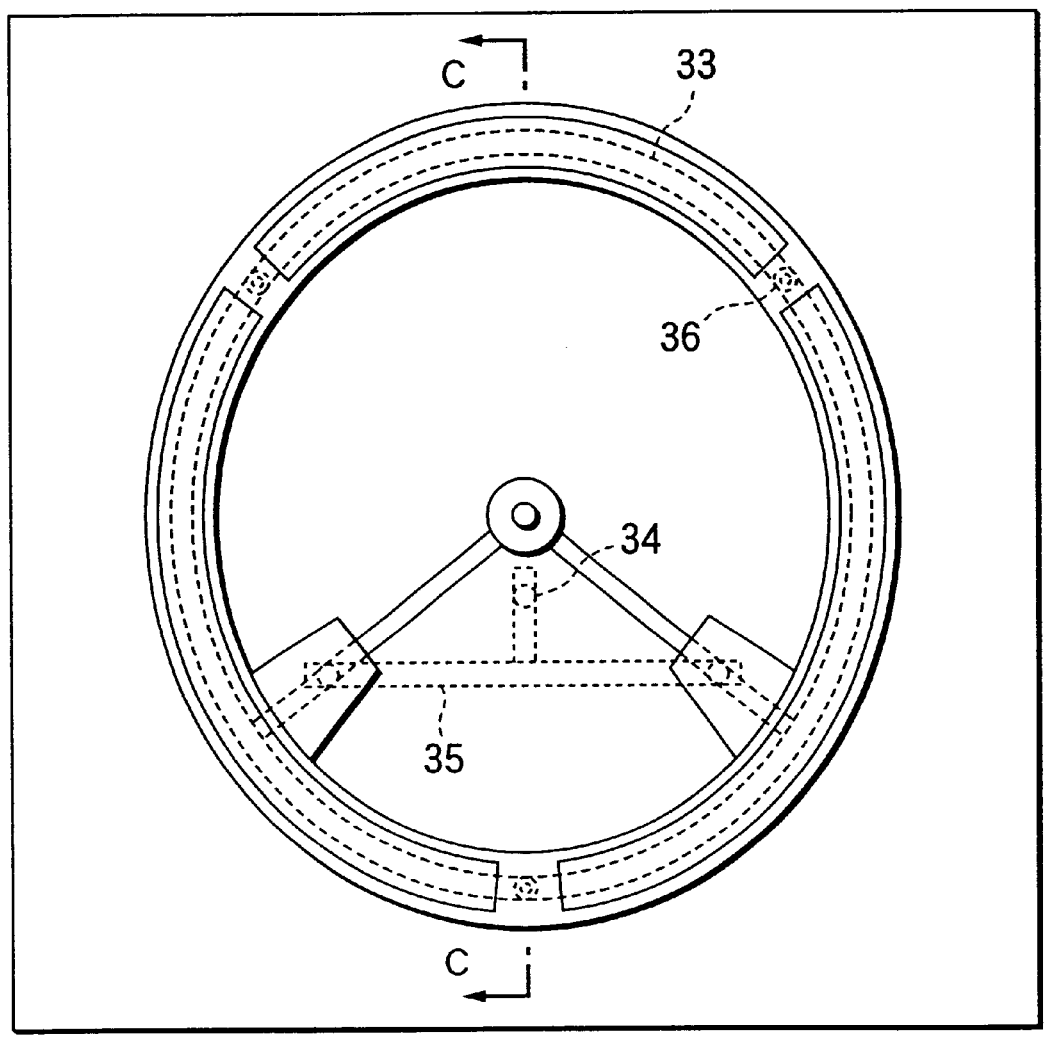
FIG. 4 is a diagram showing the structure of the mold viewed from the nozzle side of the injection molding machine.

FIGS. 3, 4 show a typical mold structure for forming of the steering wheel. FIG. 3 is a diagram showing the mold structure viewed from the side of a molding machine. The cavity part with the core bar rim part 14 inserted, has a mechanism with a part of the mold surface (non-designed surface (the surface generally not seen after mounting the steering wheel at a predetermined position of the final product, that is, the rear side part viewed from the driver side)) slidable to the cavity inside. FIG. 4 is a diagram showing the mold structure viewed from the nozzle side of the injection molding machine. A movable slide core is provided along the circumference of the steering wheel. By having the projection cross-section of the movable slide core larger, the expansion ratio of the steering wheel to be obtained can be made higher. A preferred projection area ratio is 50 to 90% with respect to the circular total projection area along the rim part 14, further preferably 70 to 85%. In the case the movable slide core projection area is less than 50%, the expansion ratio of the foamed product to be obtained is low, and thus it is not preferable. In the case the projection area is more than 90%, the slidable distance substantially cannot be obtained in a molded product with a circular cross-section, and thus it is not preferable.

Figure 5:
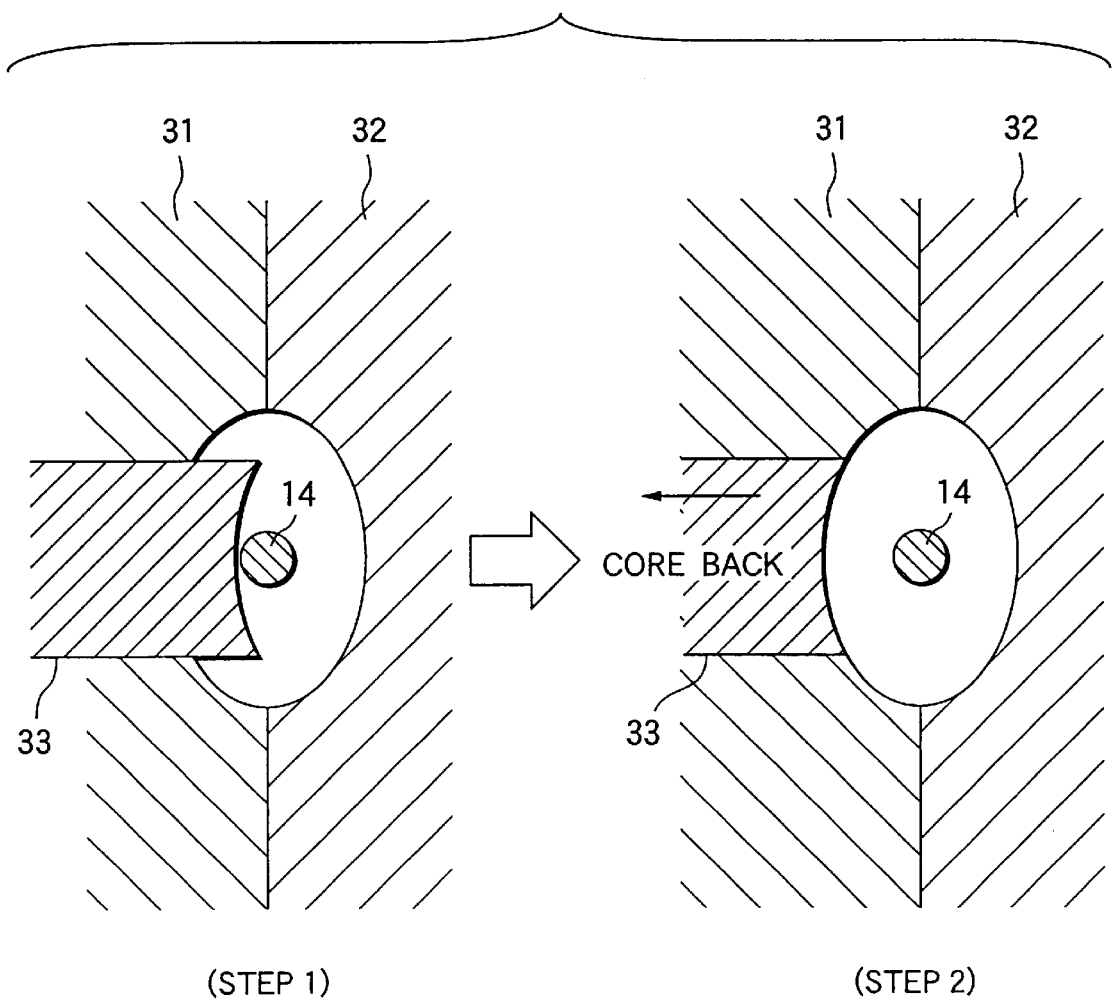
FIG. 5 is an enlarged cross-sectional view of the C—C cross-section of FIG. 4 viewed from the side of the injection molding machine.

Next, with reference to FIG. 5, a production method of the invention will be explained specifically. FIG. 5 is an enlarged cross-sectional view of the C—C cross-section of FIG. 4 viewed from the side of the injection molding machine. First, with the slide core 33 advanced, the cavity cross-sectional area is made minimum (step 1). As to the sliding distance, it is made closer to the core bar rim part 14 as much as possible. The distance between the slide core 33 and the rim 14 is set so as to be about 1 mm. In this state, the foaming TPU is injected. The cylinder temperature of the injection molding machine is selected appropriately, but it is preferably the same as or higher than the melting point of the TPU to be used, or in a range of the foaming agent decomposition temperature ±25°. The filling amount of the foaming polyurethane into the mold cavity is 60 to 100% with respect to the total cavity capacity in the state with the slide core 33 advanced, preferably 80 to 97%, and further preferably 90 to 95%. In the case the filling amount is less than 60%, the outer appearance of the final foamed product to be obtained is poor, and thus it is not preferable. The injection speed is set so as to be finished within preferably 8 seconds or less, further preferably 5 seconds or less, and still further preferably 2 seconds or less. In the condition with a more than 8 seconds injection speed, the skin layer thickness is thick so that the soft feeling cannot be obtained, and thus it is not preferable. Moreover, the mold temperature is preferably 20 to 60° C. In the case the mold temperature is less than 20° C., the skin layer is thick, but in the case it is more than 60° C., the molding cycle is prolonged, and thus it is not preferable.

Next, the movable slide core 33 is retreated immediately after finishing the injection (step 2). By retreating, the cavity capacity is increased so as to increase the expansion ratio. The timing for retreating the movable slide core 33 is within 4 seconds after finishing the injection, preferably within 2 seconds, and further preferably within 1 second. In the case the timing for retreating the movable slide core 33 is more than 4 seconds, it is cooled excessively so that the skin layer thickness is made thicker so as to loose the soft feeling, and thus it is not preferable. Moreover, in that case, even if the movable slide core 33 is retreated, the surface is completely solidified in the shape before sliding (the shape in the state with the slide core advanced) so that the slide part of the final product is dented, and thus it is not preferable. The expansion ratio is 1.1 to 8.0 times, preferably 1.2 to 3.0 times. The thickness of the skin layer of the surface layer is 0.05 to 5 mm, preferably 0.1 to 3 mm.

The molded product is taken out by opening the mold after retreating the movable slide core, and cooling by about 10 to 30 seconds. In the case of releasing the molded product, it can be taken out easily by advancing the movable slide core in the state with the mold opened.

Figure 6:
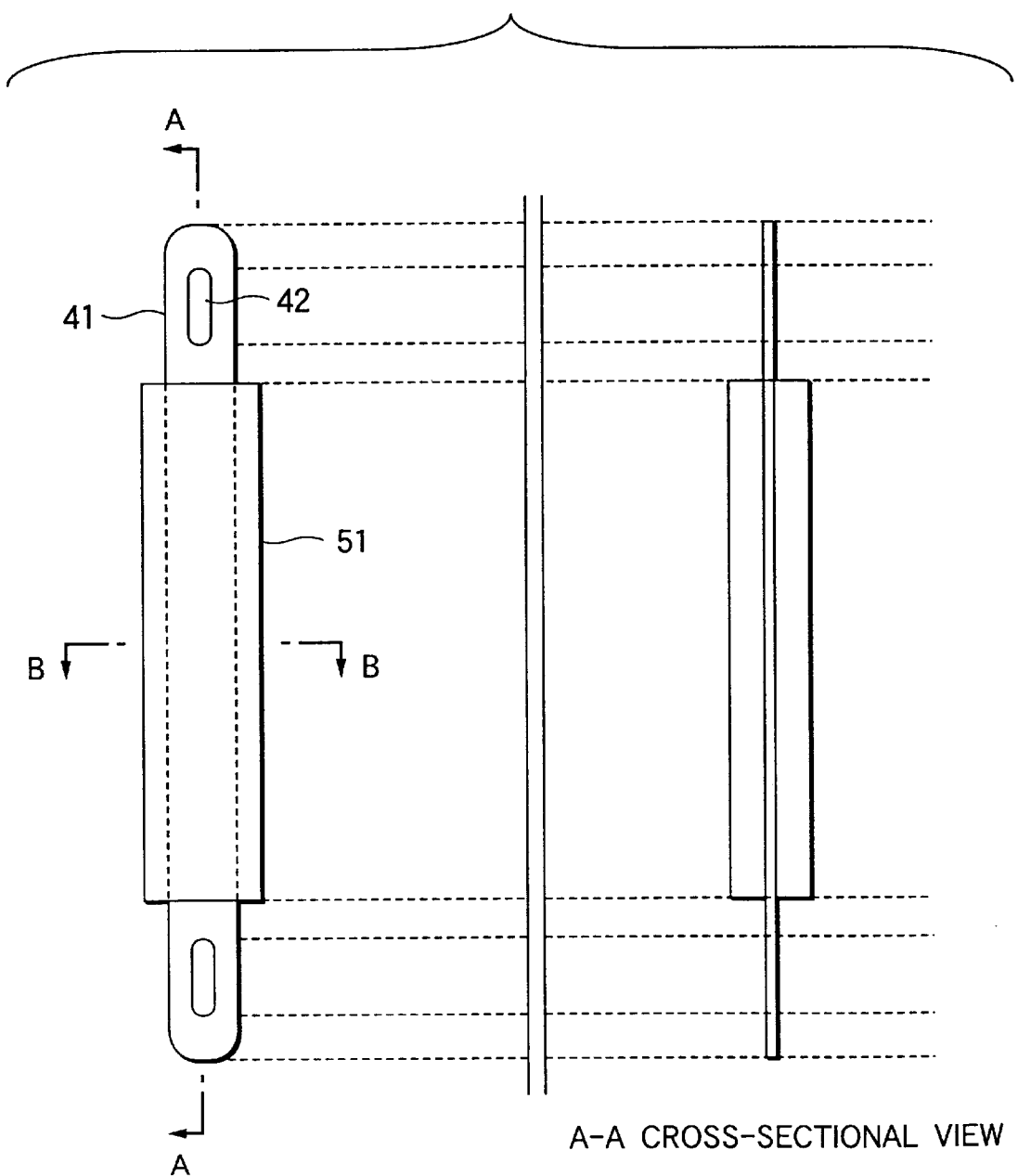
FIG. 6 is a plan view of a grip according to an embodiment of the invention and a cross-sectional view taken on the line A—A.

Next, with reference to FIGS. 6 to 10, a production method of a grip will be explained. FIG. 6 shows a grip to be molded in this example. The grip has a metal insert 41 at the center part, with a mounting hole 42 formed in the metal insert 41. The metal insert 41 is made of, in general, a metal such as an iron and an aluminum. Hereinafter it is referred to as a core bar.

The periphery of the core bar is covered with a TPU foamed product 51 provided by injection foaming.

Figure 7:
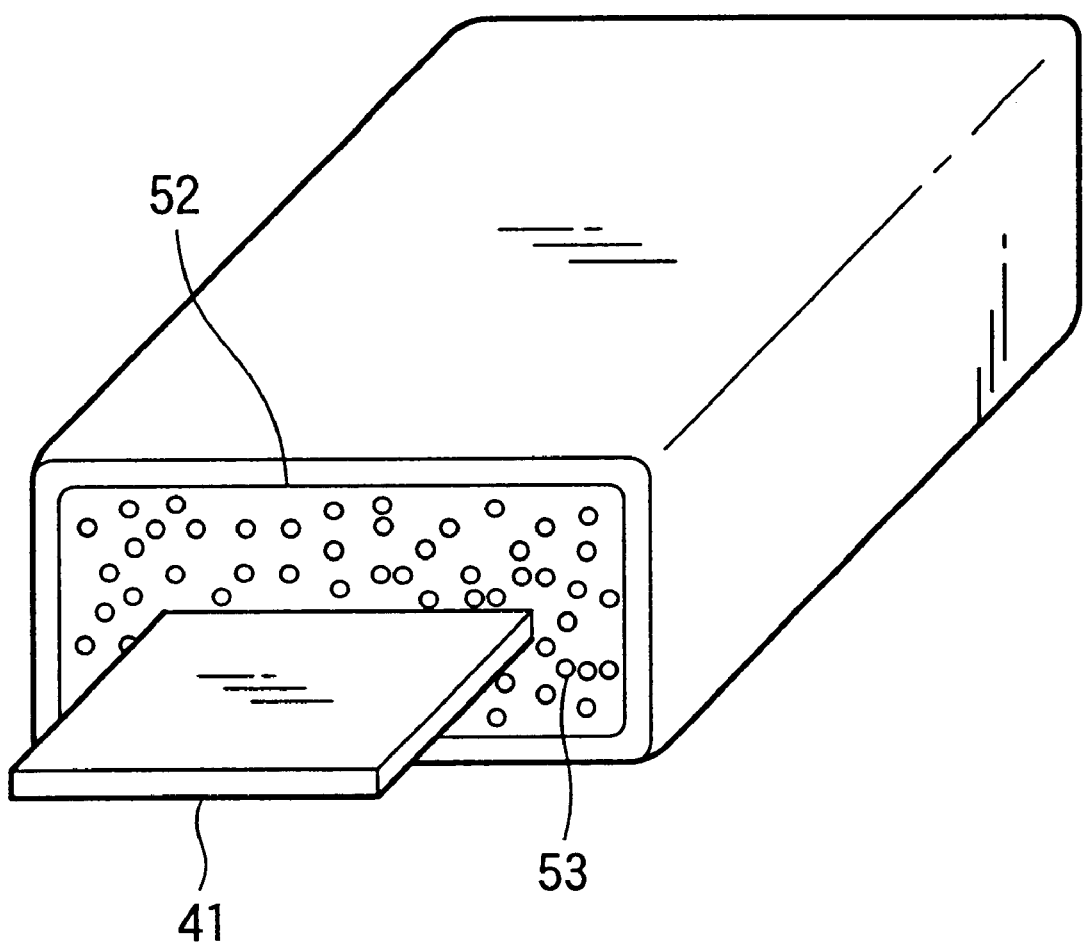
FIG. 7 is a notched perspective view taken on the B—B cross-section of the grip shown in FIG. 6.

FIG. 7 shows a notched cross-section of the B—B cross-section. The TPU molded part has the inside 53 formed, with a non-foamed skin layer 52 formed on the surface.

Figure 8:
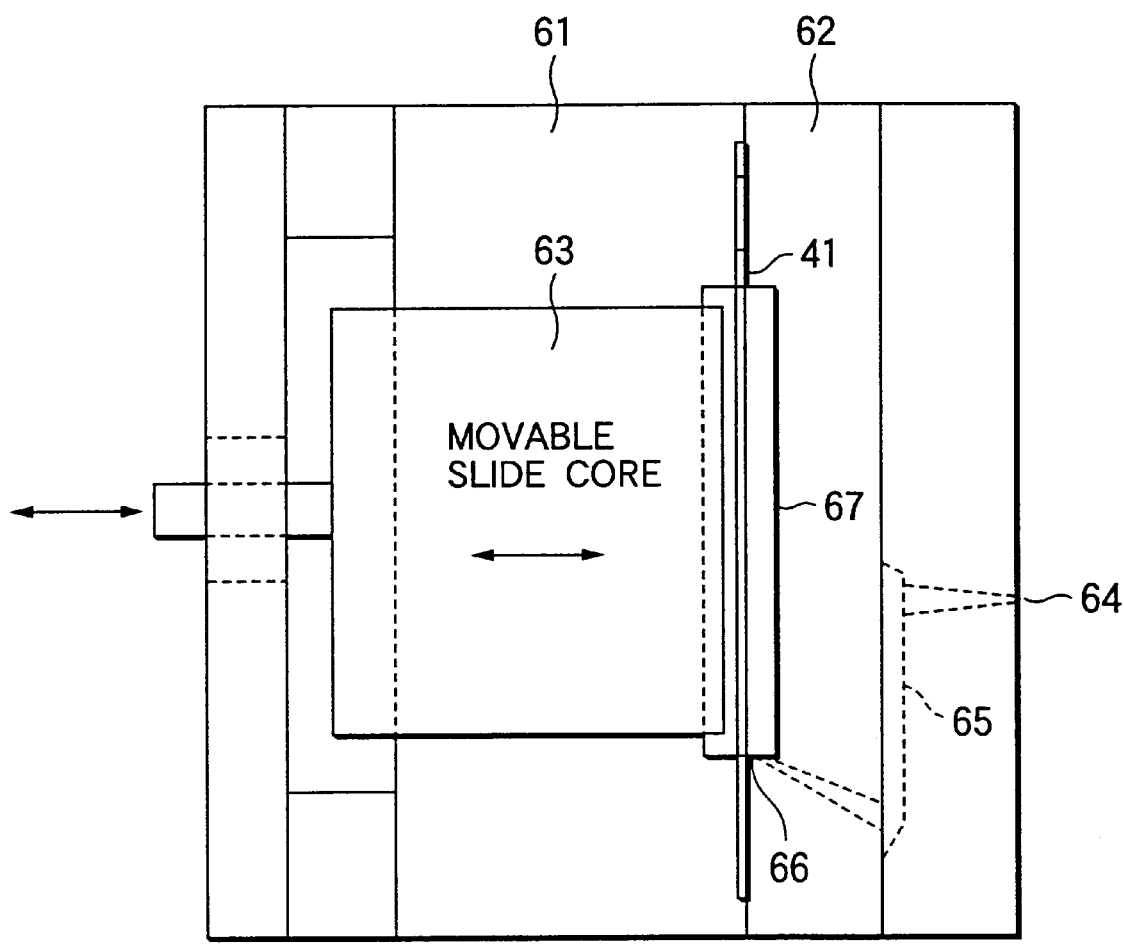
FIG. 8 is a diagram showing the structure of a mold viewed from the side of a molding machine.
Figure 9:
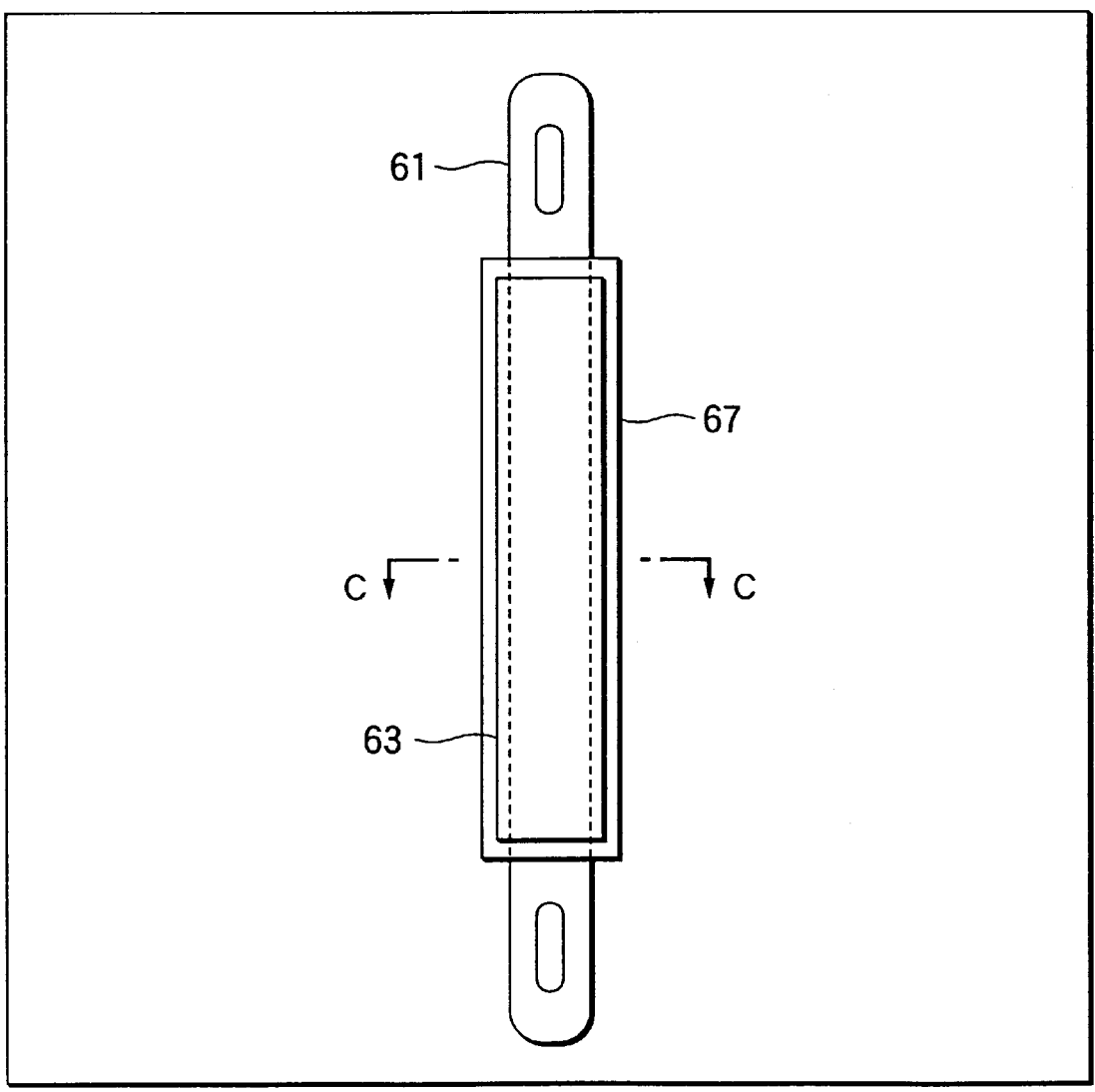
FIG. 9 is a diagram showing the structure of the mold viewed from the nozzle side of the injection molding machine.

FIGS. 8 and 9 shows the typical mold structure for foaming. FIG. 8 is a diagram showing the mold structure viewed from the side of a molding machine. The cavity part 67 with the core bar 41 inserted, has a mechanism with a movable slide core 63 slidable to the cavity inside in a non-designed part on the mold surface (the part generally not seen after mounting the grip at a predetermined position of the final product). FIG. 9 is a diagram showing the mold structure viewed from the nozzle side of the injection molding machine. The movable slide core 63 is provided such that a part of the non-designed surface of the grip is slidable. By having the projection cross-section of the movable slide core larger, the expansion ratio of the grip to be obtained can be made higher. A preferable projection area ratio is 50 to 90% with respect to the total projection area of the non-designed surface, more preferably 70 to 95%, and further preferably 70 to 85%. In the case the movable slide core projection area is less than 50%, the expansion ratio of the foamed product to be obtained is low, and thus it is not preferable. Moreover, in the case the projection area is 100%, since the cross-section of the slide part side surface (that is, the product side surface) serves as the slide part, a crimp treatment, or the like cannot be provided on the mold surface so that the outer appearance is poor, and thus it is not preferable.

Figure 10:
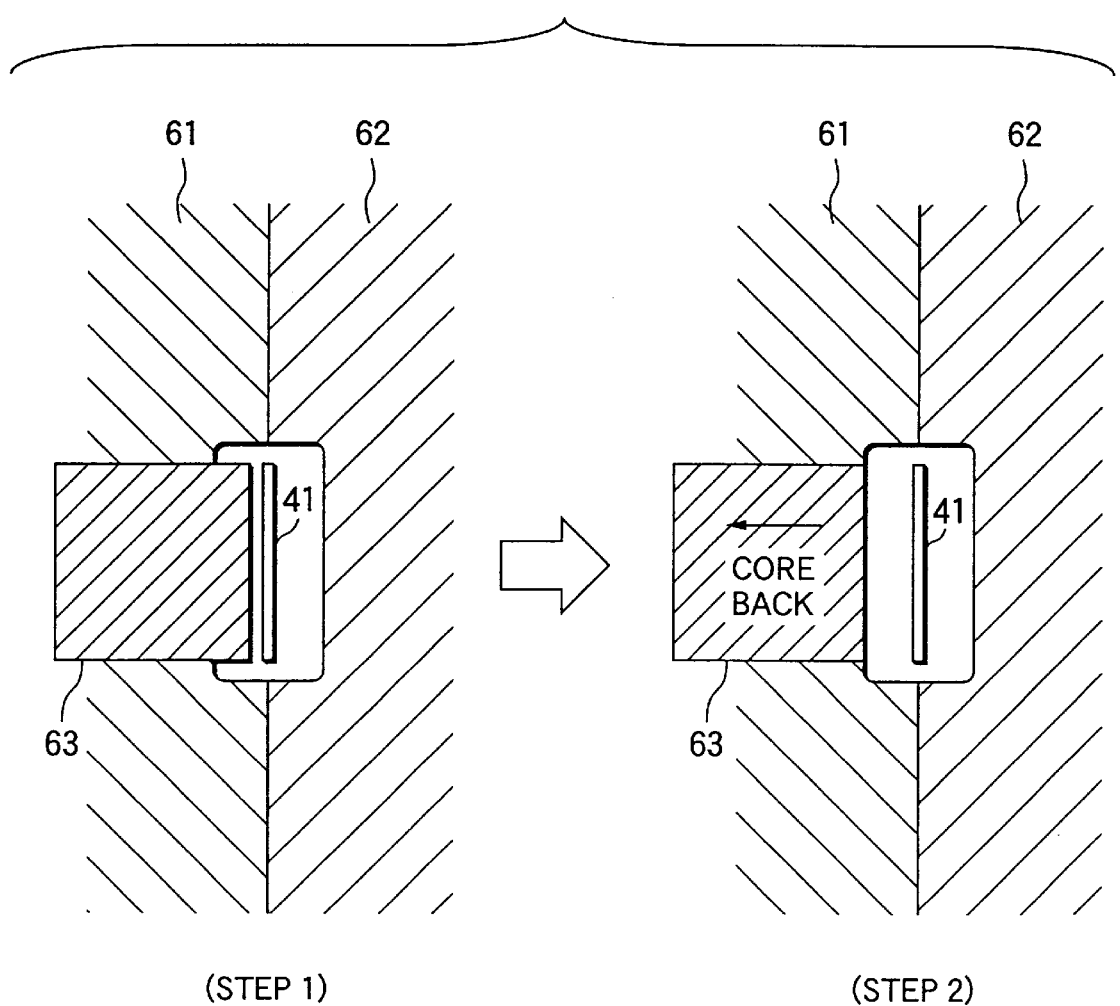
FIG. 10 is an enlarged cross-sectional view of the C—C cross-section of FIG. 9 viewed from the upside of the injection molding machine.

Next, with reference to FIG. 10, a production method of the invention will be explained further specifically. FIG. 10 is an enlarged cross-sectional view of the C—C cross-section of FIG. 9 viewed from the upside of the injection molding machine. First, with the slide core advanced, the cavity cross-sectional area is made minimum (step 1). As to the sliding distance, it is made closer to the metal insert 41 as much as possible. The distance between the slide core 63 and the metal insert 41 is set so as to be about 1 mm. In this state, the foaming TPU is injected. The cylinder temperature of the injection molding machine is selected appropriately, but it is preferably the same as or higher than the melting point of the TPU to be used, or in a range of the foaming agent decomposition temperature ±25°. The filling amount of the foaming polyurethane into the mold cavity is 60 to 100% with respect to the total cavity capacity in the state with the slide core 33 advanced, preferably 80 to 97%, and further preferably 90 to 95%. In the case the filling amount is less than 60%, the outer appearance of the final foamed product to be obtained is poor, and thus it is not preferable. The injection speed is set so as to be finished within preferably 8 seconds or less, further preferably 5 seconds or less, and still further preferably 2 seconds or less. In the condition with a more than 8 seconds injection speed, the skin layer thickness is thick so that the soft feeling cannot be obtained, and thus it is not preferable. Moreover, the mold temperature is preferably 20 to 60° C. In the case the mold temperature is less than 20° C., the skin layer is thick, but in the case it is more than 60° C., the molding cycle is prolonged, and thus it is not preferable.

Next, the movable slide core 63 is retreated immediately after finishing the injection (step 2). By retreating, the cavity capacity is increased so as to increase the expansion ratio. The timing for retreating the movable slide core is within 4 seconds after finishing the injection, preferably within 2 seconds, and further preferably within 1 second. In the case the timing for retreating the movable slide core is more than 4 seconds, it is cooled excessively so that the skin layer thickness is made thicker so as to loose the soft feeling, and thus it is not preferable. Moreover, in that case, even if the movable slide core is retreated, the surface is completely solidified in the shape before sliding (the shape in the state with the slide core advanced) so that the slide part of the final product is dented, and thus it is not preferable. The expansion ratio is 1.1 to 8.0 times, preferably 1.2 to 3.0 times. The thickness of the skin layer of the surface layer is 0.05 to 5 mm, preferably 0.1 to 3 mm.

The molded product is taken out by opening the mold after retreating the movable slide core, and cooling by about 10 to 30 seconds. In the case of releasing the molded product, it can be taken out easily by advancing the movable slide core in the state with the mold opened.

EXAMPLES

Hereinafter, the invention will be explained in greater detail, but the invention is not limited to the following Examples. Synthesis methods of aliphatic copolycarbonate diols are shown below as reference examples.

Reference Example 1

970 g (11 moles) of an ethylene carbonate (EC), 650 g (5.5 moles) of a 1,6-hexane diol (HDL), and 570 g (5.5 moles) of a 1,5-pentane diol (POL) were placed in a 3 litter flask with a 10 mm diameter and a 300 mm length, filled with a Dickson packing (diameter: 3 mm), having a distilling column, a thermometer, and an agitator. They were heated and agitated under a 20 torr reduced pressure, and controlled so as to have a 150° C. inner temperature. Reaction was carried out for 20 hours while distilling the EC and the ethylene glycol (hereinafter abbreviated as the EG) of the azeotropic composition from the vertex of the distilling column. Next, with the distilling column detached and the reduced pressure degree set to be 7 torr, the unreacted EC and the diol were collected. After finishing distillation of the unreacted product, the inner temperature was set at 190° C. While maintaining the temperature, the diol was distilled for carrying out the self condensation reaction so as to increase the molecular weight. After 4 hours, by the GPC analysis, a polymer of a 2,000 molecular weight was obtained. The yield was 740 g, and the hydroxyl value was 56 mgK/OH/g. The polymer is abbreviated as pc-a.

Reference Examples 2 to 5

In the same manner as in the reference example 1 except that a 1,4-butane dicl (SDL), a 1,5-pentane diol, and a 1,6-hexane diol were used each by the amount shown in Table 1, aliphatic copolycarbonate diols (pc-b to pc-e) were obtained. Each molecular weight is shown in Table 1.

TABLE 1

| Reference Example | BDL | PDL | HDL | Molecular weight | Abbreviation |
|---|---|---|---|---|---|
| 1 | — | 570/(5.5) | 650/(5.5) | 2000 | pc-a |
| 2 | — | 310/(3.0) | 945/(8.0) | 2000 | pc-b |
| 3 | 495/(5.5) | — | 650/(5.5) | 2100 | pc-c |
| 4 | 990/(11) | — | — | 1900 | pc-d |
| 5 | — | — | 1300/(11) | 2100 | pc-e |

The raw materials used in the examples and the comparative examples and the evaluation method are as follows.

1. Polyurethane Elastomer (Hereinafter Abbreviated as TPU) Component (1) TPU-1:

2,000 g of the pc-a obtained in the reference example 1, and 672 g of a hexamethylene diisocyanate were placed in a reaction vessel with an agitating device, a thermometer, and a cooling pipe. They were reacted for 4 hours at 100° C. so as to obtain an terminal NCO prepolymer. To the prepolymer, 283.2 g of a 1,4-butane diol as a chain extending agent, and 0.06 g of a dibutyl tin laurylate as a catalyst were added. After reacting the same at 140° C. by a laboratory universal extruding machine storing a kneader (produced by Kasamatsu Kako Kenkyusho, laboratory universal extruding machine type KR-35), the material was extruded at a 180° C. to 200° C. cylinder temperature so as to complete the reaction By a pelletizer, it was processed to be urethane pellets. The shore D hardness of the obtained urethane elastomer was 36, and the MFR was 28.

(2) TPU-2:

In the same polymerization method as in the TPU-1 synthesis method except that the pc-b was used as the polycarbonate diol, a urethane elastomer was obtained. The shore D hardness of the obtained urethane elastomer was 38, and the MFR was 25.

(3) TPU-3:

In the same polymerization method as in the TPU-1 synthesis method except that the pc-c was used as the polycarbonate diol, a urethane elastomer was obtained. The shore D hardness of the obtained urethane elastomer was 36, and the MFR was 30.

(4) TPU-4:

In the same polymerization method as in the TPU-1 synthesis method except that the pc-d was used as the polycarbonate diol, a urethane elastomer was obtained. The shore D hardness of the obtained urethane elastomer was 39, and the MFR was 29.

(5) TPU-5:

In the same polymerization method as in the TPU-1 synthesis method except that the pc-e was used as the polycarbonate diol, a urethane elastomer was obtained. The shore D hardness of the obtained urethane elastomer was 39, and the MFR was 23.

(6) TPU-6:

Synthesis was carried out in the same synthesis method as in the TPU-1 synthesis method except that a polycaprolactone polyol (produced by Daisel, praccel 220, molecular weight 2,000) was used as the aliphatic copolycarbonate diol. The shore D hardness of the obtained urethane elastomer was 35, and the MFR was 27.

2. Foamina Agent Component (1) BA-1: Azodicarboxylic Acid Amide (Decomposition Temperature: 208° C.)

(2) BA-2: Sodium Bicarbonate (Decomposition Temperature: 150° C.)

3. Injection Molding Machine

A general resin lateral type injection molding machine, injection capacity: 1,200 $cm^3$, clamping force: 1,000 tonf. Nozzle: valve nozzle (a nozzle with a pressure valve, capable of injecting by a predetermined pressure or more. Foaming in the cylinder is restrained.)

4. Evaluation Method (1) Measurement of the Expansion Ratio

Using a steering wheel mold or a grip mold, a molding operation was executed The value obtained by dividing the specific gravity at the time of non-foaming by the specific gravity of a foamed product calculated from the product volume and the weight was defined to be the expansion ratio (times). (It was corrected by subtracting the metal core weight)

(2) Measurement of the Skin Layer Thickness

A molded steering wheel or grip was cut, and observed with a magnifying glass with the graduation (the measurement portion was the B—B cross-section part in the accompanied FIG. 1, FIG. 6)

(3) Measurement Method of the Foamed Product Hardness

The designing surface of a steering wheel or grip (the measurement portion was the surface on the opposite side with respect to the surface with the slide core in the B—B cross-section part in the accompanied FIG. 1, FIG. 6) was measured based on the JIS-A hardness according to the JIS-K6301.

(4) Feeling

It was judged by the feeling at the time of grasping by a hand o: good, Δ: normal, x: poor (5) Outer Appearance It was judged by visual observation. o: good, x: failure (silver, transfer failure of a satin finished surface, or the like)

(6) Sweat Resistance

A steering wheel or grip was soaked in an artificial sweat liquid (artificial sweat liquid composition: 7 g of an NaCl, 500 cc of a methyl alcohol, 1 g of a urea, 4 g of a lactic acid, 500 cc of distilled water) at an ordinary temperature for 30 days. The outer appearance after taking out the steering wheel or grip and executing a wear test (outer appearance after the test by the JIS K7204 wear wheel) was evaluated by the three grades.

3: Outer appearance change is not observed at all.

2: Outer appearance change is slightly observed.

1: Outer appearance change is apparently observed.

Examples 1 to 12

Using the TPU-1 to 3, and a mold with the structure shown in FIGS. 3 to 5, steering wheels were molded in the molding conditions shown in Tables 2 to 4. The evaluation results of the obtained steering wheels are shown in Tables 2 to 4.

TABLE 2

| | | Example 1 | Example 2 | Example 3 | Example 4 |
|---|---|---|---|---|---|
| Material | Kind of the TPU | TPU-1 | TPU-2 | TPU-3 | TPU-4 |
| | Kind of the foaming agent | BA-1 | BA-1 | BA-1 | BA-1 |
| | Foaming agent amount (part by weight) | 3 | 1 | 3 | 3 |
| Molding | Cylinder temperature (° C.) | | | | |
| condition | Rear part | 200 | 170 | 200 | 200 |
| | Middle part | 210 | 195 | 210 | 210 |
| | Front part | 220 | 195 | 220 | 220 |
| | TPU filling amount with respect to the total cavity capacity (%) | 95 | 95 | 95 | 95 |
| | Injection time (seconds) | 2.0 | 2.0 | 2.0 | 2.0 |
| | Time from finishing the injection to starting sliding (seconds) | 0.5 | 0.5 | 0.5 | 0.5 |
| | Mold temperature (° C.) | 35 | 35 | 35 | 35 |
| Evaluation | Expansion ratio (times) | 1.7 | 1.4 | 1.7 | 1.8 |
| of | Skin layer thickness (mm) | 0.7 | 1.5 | 0.9 | 0.8 |
| the | Foamed product hardness | 73 | 78 | 76 | 79 |
| molded | Feeling | o | o | o | o |
| product | Molded product outer appearance | o | o | o | o |
| | Sweat resistance | 3 | 3 | 3 | 3 |

TABLE 3

|  |  | Example 5 | Example 6 | Example 7 | Example 8 |
|---|---|---|---|---|---|
| Material | Kind of the TPU | TPU-1 | TPU-1 | TPU-1 | TPU-1 |
|  | Kind of the foaming agent | BA-1 | BA-1 | BA-1 | BA-1 |
|  | Foaming agent amount (part by weight) | 3 | 3 | 3 | 3 |
| Molding | Cylinder temperature (° C.) |  |  |  |  |
| condition | Rear part | 200 | 200 | 200 | 200 |
|  | Middle part | 210 | 210 | 210 | 210 |
|  | Front part | 220 | 220 | 220 | 220 |
|  | TPU filling amount with respect to the total cavity capacity (%) | 80 | 100 | 95 | 95 |
|  | Injection time (seconds) | 2.0 | 2.0 | 2.0 | 1.0 |
|  | Time from finishing the injection to starting sliding (seconds) | 0.5 | 0.5 | 2.5 | 0.5 |
|  | Mold temperature (° C.) | 35 | 35 | 35 | 35 |
| Evaluation | Expansion ratio (times) | 2.0 | 1.6 | 1.4 | 1.9 |
| of | Skin layer thickness (mm) | 0.5 | 1.0 | 1.7 | 0.4 |
| the | Foamed product hardness | 67 | 76 | 80 | 72 |
| molded | Feeling | ○ | ○ | ○ | ○ |
| product | Molded product outer appearance | ○ | ○ | ○ | ○ |
|  | Sweat resistance | 3 | 3 | 3 | 3 |

TABLE 4

|  |  | Example 9 | Example 10 | Example 11 | Example 12 |
|---|---|---|---|---|---|
| Material | Kind of the TPU | TPU-1 | TPU-1 | TPU-1 | TPU-1 |
|  | Kind of the foaming agent | BA-2 | BA-2 | BA-2 | BA-2 |
|  | Foaming agent amount (part by weight) | 1 | 1 | 1 | 1 |
| Molding | Cylinder temperature (° C.) |  |  |  |  |
| condition | Rear part | 150 | 165 | 165 | 175 |
|  | Middle part | 165 | 175 | 175 | 185 |
|  | Front part | 165 | 175 | 175 | 185 |
|  | TPU filling amount with respect to the total cavity capacity (%) | 95 | 95 | 95 | 95 |
|  | Injection time (seconds) | 1.5 | 2.0 | 4.0 | 2.0 |
|  | Time from finishing the injection to starting sliding (seconds) | 0.1 | 0.1 | 1.0 | 0.1 |
|  | Mold temperature (° C.) | 40 | 40 | 40 | 40 |
| Evaluation | Expansion ratio (times) | 1.8 | 1.7 | 1.4 | 1.9 |
| of | Skin layer thickness (mm) | 0.8 | 0.9 | 1.4 | 0.8 |
| the | Foamed product hardness | 73 | 76 | 79 | 72 |
| molded | Feeling | ○ | ○ | ○ | ○ |
| product | Molded product outer appearance | ○ | ○ | ○ | Δ |
|  | Sweat resistance | 3 | 3 | 3 | 3 |

Comparative Examples 1 to 3

Using the TPU-4, TFU-5, TFU-6, steering wheels were molded in the conditions shown in Table 5. Results are shown in Table 5. As shown in Table 5, the steering wheels molded with the materials other than those of the invention involves a problem.

TABLE 5

|  |  | Comparative Example 1 | Comparative Example 2 | Comparative Example 3 |
|---|---|---|---|---|
| Material | Kind of the TPU | TPU-4 | TPU-5 | TPU-6 |
|  | Kind of the foaming agent | BA-1 | BA-1 | BA-1 |
|  | Foaming agent amount (part by weight) | 3 | 3 | 3 |
| Molding | Cylinder temperature (° C.) |  |  |  |
| condition | Rear part | 200 | 200 | 200 |
|  | Middle part | 210 | 210 | 210 |
|  | Front part | 220 | 220 | 220 |
|  | TPU filling amount with respect | 95 | 95 | 95 |

TABLE 5-continued

|  |  | Comparative Example 1 | Comparative Example 2 | Comparative Example 3 |
|---|---|---|---|---|
|  | to the total cavity capacity (%) |  |  |  |
|  | Injection time (seconds) | 2.0 | 2.0 | 2.0 |
|  | Time from finishing the injection to starting sliding (seconds) | 0.5 | 0.5 | 0.5 |
|  | Mold temperature (° C.) | 35 | 35 | 35 |
| Evaluation | Expansion ratio (times) | 1.7 | 1.7 | 1.8 |
| of | Skin layer thickness (mm) | 0.8 | 0.8 | 0.9 |
| the | Foamed product hardness | 83 | 83 | 76 |
| molded | Feeling | Δ | Δ | ○ |
| product | Molded product outer appearance | ○ | ○ | ○ |
|  | Sweat resistance | 2 | 2 | 1 |

<Example 13 to 24

Using the TPU-1 to 3, and a mold with the structure shown in FIGS. 8 to 10, grips were molded in the molding conditions shown in Tables 6 to 8. The evaluation results of the obtained grips are shown in Tables 6 to 8.

TABLE 6

|  |  | Example 13 | Example 14 | Example 15 | Example 16 |
|---|---|---|---|---|---|
| Material | Kind of the TPU | TPU-1 | TPU-1 | TPU-2 | TPU-3 |
|  | Kind of the foaming agent | BA-1 | BA-1 | BA-1 | BA-1 |
|  | Foaming agent amount (part by weight) | 3 | 1 | 3 | 3 |
| Molding | Cylinder temperature (° C.) |  |  |  |  |
| condition | Rear part | 200 | 170 | 200 | 200 |
|  | Middle part | 210 | 195 | 210 | 210 |
|  | Front part | 220 | 195 | 220 | 220 |
|  | TPU filling amount with respect to the total cavity capacity (%) | 95 | 95 | 95 | 95 |
|  | Injection time (seconds) | 2.0 | 2.0 | 2.0 | 2.0 |
|  | Time from finishing the injection to starting sliding (seconds) | 0.5 | 0.5 | 0.5 | 0.5 |
|  | Mold temperature (° C.) | 35 | 35 | 35 | 35 |
| Evaluation | Expansion ratio (times) | 1.9 | 1.6 | 1.8 | 1.8 |
| of | Skin layer thickness (mm) | 0.7 | 1.3 | 0.9 | 0.7 |
| the | Foamed product hardness | 70 | 75 | 74 | 76 |
| molded | Feeling | ○ | ○ | ○ | ○ |
| product | Molded product outer appearance | ○ | ○ | ○ | ○ |
|  | Sweat resistance | 3 | 3 | 3 | 3 |

TABLE 7

|  |  | Example 17 | Example 18 | Example 19 | Example 20 |
|---|---|---|---|---|---|
| Material | Kind of the TPU | TPU-1 | TPU-1 | TPU-1 | TPU-1 |
|  | Kind of the foaming agent | BA-1 | BA-1 | BA-1 | BA-1 |
|  | Foaming agent amount (part by weight) | 3 | 3 | 3 | 3 |
| Molding | Cylinder temperature (° C.) |  |  |  |  |
| condition | Rear part | 200 | 200 | 200 | 200 |
|  | Middle part | 210 | 215 | 210 | 210 |
|  | Front part | 220 | 220 | 220 | 220 |
|  | TPU filling amount with respect to the total cavity capacity (%) | 80 | 100 | 95 | 95 |
|  | Injection time (seconds) | 2.0 | 2.0 | 2.0 | 1.0 |
|  | Time from finishing the injection to starting sliding (seconds) | 0.5 | 0.5 | 2.5 | 1.0 |
|  | Mold temperature (° C.) | 35 | 35 | 35 | 35 |
| Evaluation | Expansion ratio (times) | 2.2 | 1.6 | 1.4 | 1.9 |
| of | Skin layer thickness (mm) | 0.5 | 1.0 | 1.7 | 0.4 |
| the | Foamed product hardness | 65 | 75 | 80 | 70 |
| molded | Feeling | ○ | ○ | Δ | ○ |

TABLE 7-continued

|   |   | Example 17 | Example 18 | Example 19 | Example 20 |
|---|---|---|---|---|---|
| product | Molded product outer appearance | ○ | ○ | ○ | ○ |
|  | Sweat resistance | 3 | 3 | 3 | 3 |

TABLE 8

|   |   | Example 21 | Example 22 | Example 23 | Example 24 |
|---|---|---|---|---|---|
| Material | Kind of the TPU | TPU-1 | TPU-1 | TPU-1 | TPU-1 |
|  | Kind of the foaming agent | BA-2 | BA-2 | BA-2 | BA-2 |
|  | Foaming agent amount (part by weight) | 1 | 1 | 1 | 1 |
| Molding | Cylinder temperature (° C.) |  |  |  |  |
| condition | Rear part | 150 | 165 | 165 | 175 |
|  | Middle part | 165 | 175 | 175 | 185 |
|  | Front part | 165 | 175 | 175 | 185 |
|  | TPU filling amount with respect to the total cavity capacity (%) | 95 | 95 | 95 | 95 |
|  | Injection time (seconds) | 1.5 | 2.0 | 4.0 | 2.0 |
|  | Time from finishing the injection to starting sliding (seconds) | 0.1 | 0.1 | 0.1 | 0.1 |
|  | Mold temperature (° C.) | 40 | 40 | 40 | 40 |
| Evaluation | Expansion ratio (times) | 2.3 | 2.0 | 1.7 | 2.2 |
| of | Skin layer thickness (mm) | 0.7 | 0.8 | 1.2 | 0.8 |
| the | Foamed product hardness | 69 | 71 | 75 | 68 |
| molded | Feeling | ○ | ○ | ○ | ○ |
| product | Molded product outer appearance | ○ | ○ | ○ | Δ |
|  | Sweat resistance | 3 | 3 | 3 | 3 |

Comparative Examples 4 to 6

Using the TPU-4, TPU-5, TPU-6, grips were molded in the conditions shown in Table 9. Results are shown in Table 9. As shown in Table 9, the grips molded with the materials other than those of the invention involves a problem.

INDUSTRIAL APPLICABILITY

The invention provides a gripping part such as a steering wheel and a grip, having a soft feeling equivalent to a RIM urethane and excellent sweat resistance, without the need of coating, and solves the problems involved in RIM urethane

TABLE 9

|   |   | Comparative Example 4 | Comparative Example 5 | Comparative Example 6 |
|---|---|---|---|---|
| Material | Kind of the TPU | TPU-4 | TPU-5 | TPU-6 |
|  | Kind of the foaming agent | BA-1 | BA-1 | BA-1 |
|  | Foaming agent amount (part by weight) | 3 | 3 | 3 |
| Molding | Cylinder temperature (° C.) |  |  |  |
| condition | Rear part | 200 | 200 | 200 |
|  | Middle part | 210 | 210 | 210 |
|  | Front part | 220 | 220 | 220 |
|  | TPU filling amount with respect to the total cavity capacity (%) | 95 | 95 | 95 |
|  | Injection time (seconds) | 2.0 | 2.0 | 2.0 |
|  | Time from finishing the injection to starting sliding (seconds) | 0.5 | 0.5 | 0.5 |
|  | Mold temperature (° C.) | 35 | 35 | 35 |
| Evaluation | Expansion ratio (times) | 1.8 | 1.6 | 1.8 |
| of | Skin layer thickness (mm) | 0.8 | 0.8 | 0.9 |
| the | Foamed product hardness | 81 | 78 | 79 |
| molded | Feeling | Δ | Δ | Δ |
| product | Molded product outer appearance | ○ | ○ | ○ |
|  | Sweat resistance | 2 | 2 | 1 | steering wheels and grips, including low productivity, low recycling property, and the like, and further is capable of eliminating a coating step.

What is claimed is:

1. A gripping part comprising a foamed product of a thermoplastic elastomer with a 1.1 to 8.0 times expansion ratio, wherein the thermoplastic elastomer is a polyurethane elastomer produced by copolymerizing the following (a) and (b):

(a) a polymer polyol including an aliphatic polycarbonate comprising repeating units of the following formulae (1) and (2), with the ratio ((1)/(2)) of (1) to (2) being 10/90 to 90/10 (molar ratio) (wherein n is an integer of 4 and/or 5),

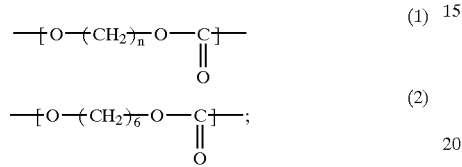

and (b) a polyisocyanate.

2. The gripping part according to claim 1, wherein the components to be copolymerized further contain (c) a chain extending agent that is reactive with the polyisocyanate.

3. The gripping part according to claim 1, further having a non-foamed skin layer, which has a thickness of 0.05 mm to 5 mm, as a surface skin layer.

4. The gripping part according to claim 1, wherein the thermoplastic elastomer composition comprises at least one additive selected from the group consisting of a heat stabilizing agent and a light stabilizing agent, added in an amount from 0.01 to 10 parts by weight per 100 parts by weight of the polyurethane elastomer.

5. The gripping part according to claim 1, further comprising a metal core inserted to the inside thereof.

6. The gripping part according to claim 1, which is formed into a steering wheel or a grip.

7. A method for producing a gripping part, comprising the steps of:

injecting a foaming polyurethane elastomer comprising 100 parts by weight of (A) a polyurethane elastomer according to claim 1, and 0.01 to 10 parts by weight of (B) a foaming agent, into a mold cavity of a mold having a movable slide core provided on a non-designed surface of the cavity, with the slide core preliminarily slid to the cavity inside, by a filling amount of 60% or more with respect to the total cavity capacity in the state where the slide core is slid into the cavity; and retreating the slide core after finishing the injection to carry out foaming.

8. The method for producing a gripping part according to claim 7, wherein the thermoplastic elastomer composition comprises at least one additive selected from the group consisting of a heat stabilizing agent and a light stabilizing agent, added in an amount from 0.01 to 10 parts by weight per 100 parts by weight of the polyurethane elastomer.

* * * * *